United States Patent [19]

Niwa et al.

[11] Patent Number: 4,808,776

[45] Date of Patent: Feb. 28, 1989

[54] HORN SWITCH MECHANISM ON STEERING WHEEL

[75] Inventors: Minoru Niwa, Ichinomiya; Takahiro Hashiba, Ama, both of Japan

[73] Assignee: Toyoda Gosei Co., Ltd., Nishikasugai, Japan

[21] Appl. No.: 144,233

[22] Filed: Jan. 15, 1988

[30] Foreign Application Priority Data

Jan. 21, 1987 [JP] Japan ................................ 62-11568

[51] Int. Cl.$^4$ ........................ H01H 9/00; B60Q 5/00; B62D 1/04
[52] U.S. Cl. ................................ 200/61.55; 200/61.56
[58] Field of Search ........................ 200/61.54–61.57

[56] References Cited

U.S. PATENT DOCUMENTS

| | | | |
|---|---|---|---|
| 2,179,653 | 11/1939 | Weil | 200/61.56 |
| 2,894,090 | 7/1959 | Timoff et al. | 200/61.56 |
| 3,712,968 | 1/1973 | Bonn et al. | 200/61.56 |
| 4,004,114 | 1/1977 | Baduel | 200/61.56 |
| 4,447,684 | 5/1984 | Sugiyama | 200/61.57 X |
| 4,590,340 | 5/1986 | Koike et al. | 200/61.55 X |
| 4,594,486 | 6/1986 | Noda | 200/61.54 |
| 4,612,425 | 9/1986 | Kanai et al. | 200/61.55 |
| 4,655,101 | 4/1987 | Endo et al. | 74/552 |

FOREIGN PATENT DOCUMENTS

| | | |
|---|---|---|
| 2021930 | 11/1971 | Fed. Rep. of Germany . |
| 58-35435 | 3/1983 | Japan . |
| 61-36450 | 10/1986 | Japan . |
| 62-19603 | 4/1987 | Japan . |

Primary Examiner—J. R. Scott
Attorney, Agent, or Firm—Cushman, Darby & Cushman

[57] ABSTRACT

A horn switch mechanism mounted on a steering wheel includes a stationary contact plate, movable contact plates disposed upwardly away from the stationary contact plate, and a horn pad covering over the contact plates. The stationary and movable contact plates are spaced away from each other by springs interposed between the stationary contact plate and the movable contact plates, while a distance of the space between the two contact plates is restricted by flanged spacers which are inserted downwardly through respective insertion bores of the movable contact plate and secured to the stationary contact plate. Each flanged spacer is received in a respective projection formed on the stationary contact plate. The stationary contact plate has its contact points formed on the upper ends of the guide projections, and the movable contact plate has its contact points formed on respective annular lower edges defining the insertion bores.

5 Claims, 6 Drawing Sheets

PRIOR ART Fig.2

HORN SWITCH MECHANISM ON STEERING WHEEL

BACKGROUND OF THE INVENTION

1. Field of the Invention

The present invention relates to a horn switch mechanism mounted on a steering wheel of an automobile.

2. Description of the Prior Art

A known horn switch mechanism of this type is disclosed in Japanese Utility Model Laid-Open Publication No. 57-157569. As reillustrated in FIGS. 1 and 2 of the accompanying drawings, the disclosed switch mechanism is disposed on the top of a boss of the steering wheel. The switch mechanism includes a stationary contact plate 3 in the form of a boss plate 2 made of a steel plate and connected integrally to the boss which is mounted on a steering shaft (not shown), and a movable contact plate 4 made of a steel plate held by a horn pad 1 therein and disposed above the stationary contact plate. The boss plate 2 constitutes a part of a metal core member of the boss.

The stationary contact plate 3 is electrically connected to a negative terminal of a horn control circuit (not shown), and has a plurality of contact points 3a and a plurality of threaded holes 3b at predetermined positions.

The movable contact plate 4 is electrically connected to a positive terminal of the control circuit and has a plurality of downwardly (in FIG. 1) protruded portions defining contact points 4a each in registry with the corresponding contact points 3a. The movable contact plate 4 also has a plurality of insertion bores 4b each in registry with a corresponding threaded hole 3b. A pair of lateral bores or windows 4c, 4c are disposed in the movable contact plate 4 peripherally of each insertion bore 4b.

A cylindrical or tubular retainer clip 5 of a synthetic resin has a pair of locking legs 5a, 5a which are inserted upwardly through the windows for locking engagement with the movable contact plate 4. A coil spring 6 is retained by the retainer clip 5 and disposed between the clip and the stationary contact plate 3 so as to urge the movable contact plate 4 to move upwardly away from the stationary contact plate 3. The retainer clip 5 has locking studs 5b each having a downwardly slanted surface for holding an upper end of the coil spring 6.

A flanged spacer 7 of synthetic resin, having a flange 7a at its upper end, is inserted downwardly through the insertion bore 4b of the movable contact plate 4 and through the retainer clip 5, and is secured to the stationary contact plate 3 by a screw 8 threaded downwardly into a threaded hole 3b of the stationary contact plate 3 through the retainer clip 5. The flange 7a of the flanged spacer 7 is held in engagement with an upper surface of the movable contact plate 4 peripherally of the insertion bore 4b, thereby restricting upward movement of the movable contact plate 4 away from the stationary contact plate 3 and hence, the distance of the space therebetween.

In operation, the horn pad 1 is pressed down by the operator or driver of the car, whereupon the movable contact plate 4 is moved downwardly along the shaft of the flanged spacer 7 against the bias force of the coil spring 6. At this time, the contact point 4a of the movable contact plate 4 is brought into contact with the contact point 3a of the stationary contact plate 3, with the result that the horn control circuit is energized to operate the horn.

In this switch mechanism, the two contact plates 3, 4 are brought into contact with each other at a point disposed remotely from the flanged spacer 7 which serves to guide the vertical movement of the movable contact plate 4. In other words, the two contact points 3a, 4a of the stationary and movable contact plates 3, 4 are located remotely from the flanged spacer 7 along which the movable contact plate 4 is moved down. To this end, the relative location between the contact points 3a, 4a of the two contact plates 3 and 4, and between the threaded hole 3b and the insertion bore 4b, as well as the distance between the contact point 3a and the threaded hole 3b and between the contact point 4a and the insertion bore 4b are controlled with a great precision at the time of assembly of the horn switch mechanism. In addition, it is tedious and laborious to control the relative positions of those contact points 3a, 4a, the threaded hole 3b, and the insertion bores 4b.

The foregoing switch mechanism is also disadvantageous in that a plate portion surrounding the threaded bore 3b of the stationary contact plate 3 has a flat surface, which allows the movable contact plate 4 to be easily displaced sidewardly relative to the stationary contact plate 3 when the screw 8 is inserted through the insertion bore 4b of the movable contact plate 4 for attachment of the spacer to the stationary contact plate 3. This objectionable displacement of the movable contact plate 4 delays the aligning of the two plates because the displaced plate makes it difficult to locate the threaded hole on the stationary plate 3. Thus the attachment thereof requires skill and careful work of the worker.

SUMMARY OF THE INVENTION

It is therefore an object of the present invention to provide a horn switch mechanism mounted on a steering wheel, such as of an automobile, in which mechanism contact points and flanged spacers are precisely positioned with ease, and a flanged spacer is fixed to a stationary contact plate devoid of displacement of a movable contact plate relative to the stationary plate, thereby facilitating the assembling process of the mechanism.

The above-described object is achieved by a horn switch mechanism according to the present invention, which comprises:

a stationary contact plate;

a movable contact plate disposed upwardly away from said stationary contact plate;

a horn pad connected to said movable contact plate and covering over the same;

spring means disposed between said movable contact plate and said stationary contact plate for normally urging the two contact plates away from each other;

a plurality of cylindrical projections projecting upwardly from said stationary contact plate, said movable contact plate having plurality of bores of a diameter substantially equal to an inside diameter of said projection, each bore being disposed in registry with the corresponding one of the projections; and a plurality of spacers each having a flange at its upper portion, and being inserted downwardly through said bore of said movable contact plate into said projection so as to be secured fixedly to said stationary contact plate, said flange of said spacer disposed in engagement with an upper surface of said movable contact plate at its peripheral edge defining said bore for restricting a further upward movement of said movable contact plate in a direction away from said stationary contact plate caused by said spring means means, respective upper ends of said projections of said stationary contact plate each forming a first contact member, and respective lower surfaces of said movable contact plate each forming a second contact member adapted to touch with the first contact member.

With this arrangement, the horn switch mechanism of the present invention includes stationary and movable contact plates which are adapted to contact each other at a point located substantially in registry with the location of the flanged spacer, with the result that it is unnecessary to control the distance between the contact point and the flanged spacer during assembly thereof, which is required for the known horn switch mechanism, and only the location of the flanged spacer (and hence of the contact point) with respect to the stationary contact plate needs to be controlled.

When a screw is threaded into the stationary contact plate through the spacer, an objectionable displacement of the movable contact plate relative to the stationary contact plate is prevented by the arrangement that the flanged spacer is guidingly received in the projection on the stationary contact plate, thus facilitating the screw-fastening of the flanged spacer to the plate.

The horn switch mechanism according to the present invention has advantages in that the contact points and the flanged spacers are precisely located with ease, and the flanged spacers are secured by screws devoid of displacement of the movable contact plate with respect to the stationary contact plate, thereby facilitating the assembly of the horn switch mechanism.

DESCRIPTION OF PREFERRED EMBODIMENTS

With reference to the accompanying drawings, preferred embodiments of the present invention are described hereinbelow.

As shown in FIGS. 3 to 7, a steering wheel W includes a steering wheel metal core member w having a boss b of a boss unit B, metal core members s of spokes S, and a metal core member r of a steering ring R, all of these components being connected to each other via links k. (See FIGS. 5 to 7.) Each link k is made of an electrically conductive die-casting alloy such as of aluminum or magnesium. The boss b and metal core members s, r are made of a metal alloy of steel or aluminum which has a desired mechanical strength.

The link k connecting the boss b to the metal core members s of the spokes S has four legs extending in the general plane of the link, and forms a boss plate 12 serving as a stationary contact plate 13.

Figure 1:
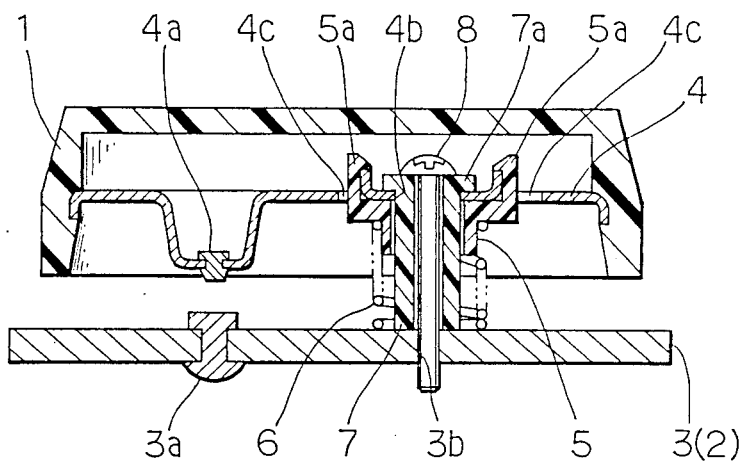
FIG. 1 is a vertical cross-sectional view of a prior art horn switch mechanism.
Figure 2:
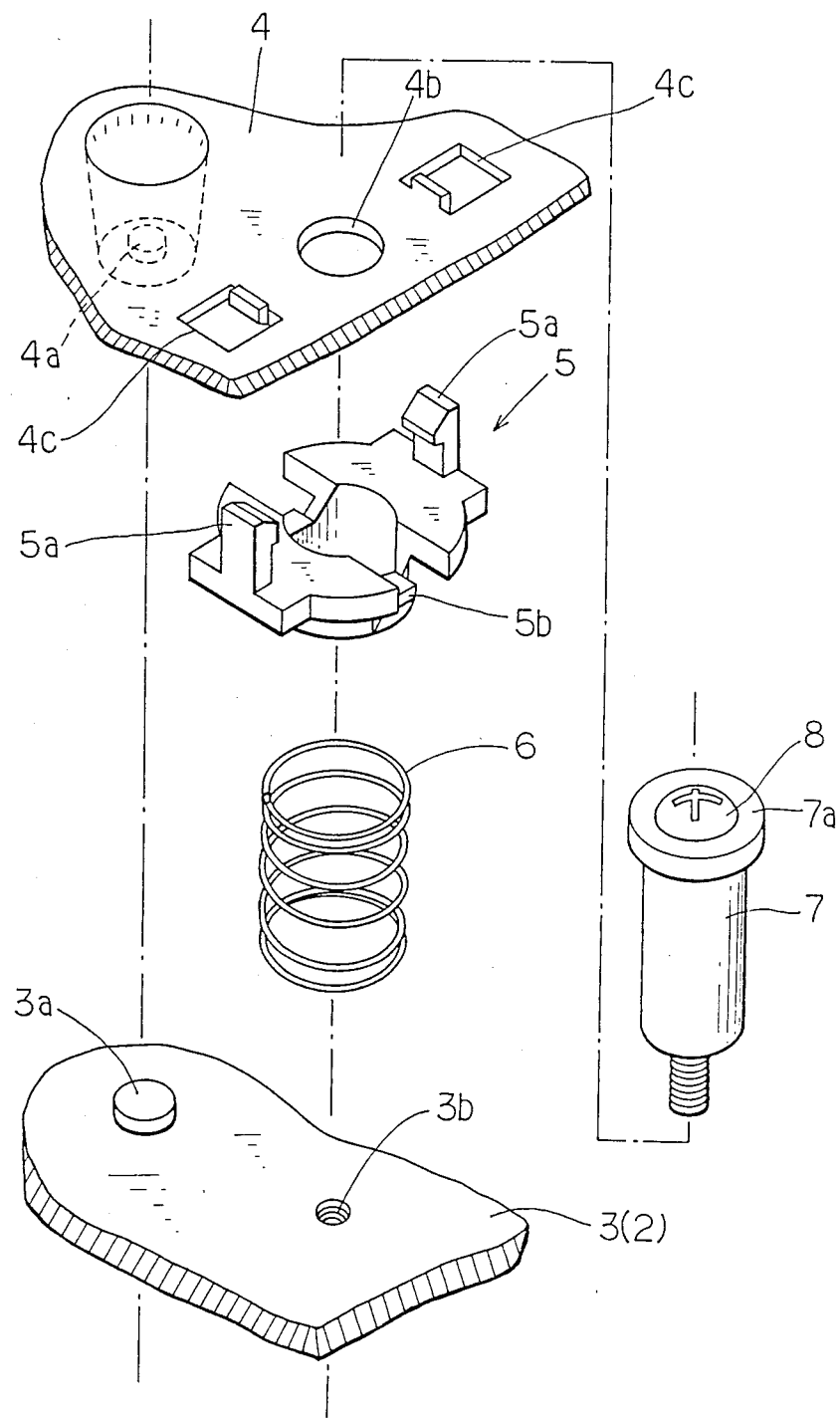
FIG. 2 is an exploded perspective view of primary parts of the prior art horn switch mechanism of FIG. 1.
Figure 3:
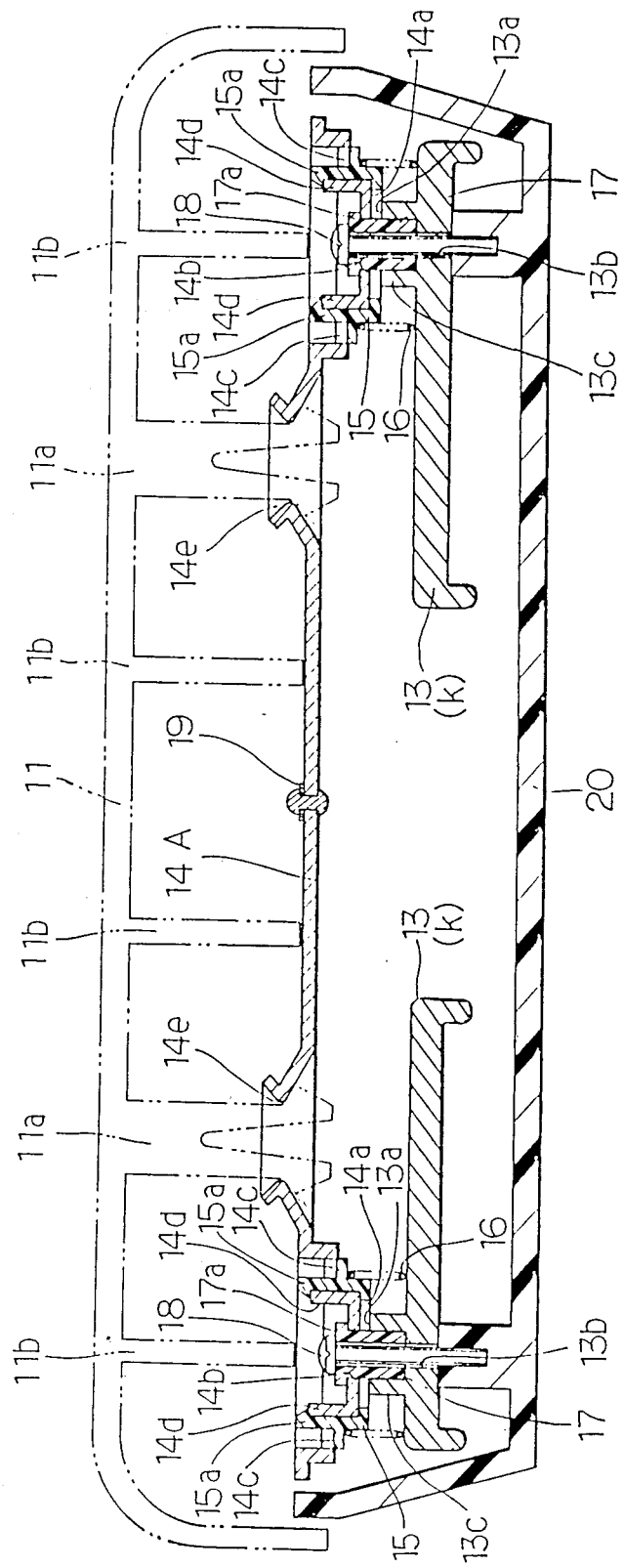
FIG. 3 is a vertical cross-sectional view, taken along line III—III of FIG. 5, of a horn switch mechanism according to an embodiment of the present invention.

The stationary contact plate 13 has four cylindrical or tubular guide projections 13c projecting upwardly therefrom. A vertical through-hole 13b is formed in the bottom of each guide projection 13c (FIG. 3). The guide projection 13c and the through-hole 13b are formed integrally with the stationary contact plate 13 when the latter is molded. (See FIGS. 3, 4 and 6).

Figure 5:
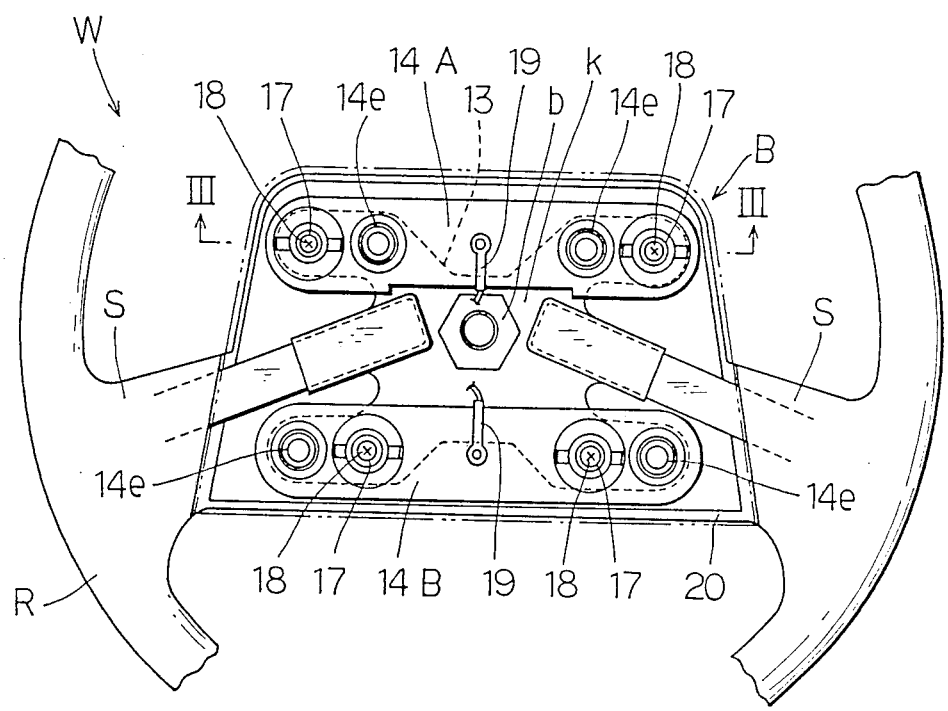
FIG. 5 is a plan view of the horn switch mechanism.

A pair of movable contact plates 14A and 14B is disposed above the stationary contact plate 13 to extend in parallel, spaced axially apart from each other, in a front-rear direction (i.e. a vertical direction in FIG. 5). Each movable contact plate 14A (14B) is made of a conductive steel plate by a cold-pressing process.

Each movable contact plate 14A (14B) has a plurality of two-stepped recesses 14r, each disposed in registry with a respective through-hole 13b of the stationary contact plate 13, and a insertion bore 14b disposed centrally in the bottom wall of each recess, through which the respective flanged spacer 17 is inserted downwardly, as described later on. The insertion bore 14b has a diameter equal to the inside diameter of the guide projection 13c. (See FIGS. 3 and 4) As best shown in FIG. 4, a pair of locking projections or hooks 14d is raised from the upper step portion 14u of the stepped recess, and thus forms a pair of windows (i.e., apertures) 14c at diametrically opposite positions about the insertion bore 14b.

A tubular retainer clip 15 made of a conventional resilient material such as a synthetic resin is secured to the hooks 14d and underlies the same. The retainer clip 15 has a pair of locking legs 15a to be passed through the windows 14c and to be held by the hooks 14d in a locking engagement. A compression coil spring 16 (spring means) is held by the retainer clip 15 so as to interpose between the clip secured to the movable contact plates 14A (14B) and the stationary contact plate 13. The spring 16 normally urges the respective movable contact plate 14A (14B) to move upwardly away from the stationary contact plate 13.

Figure 4:
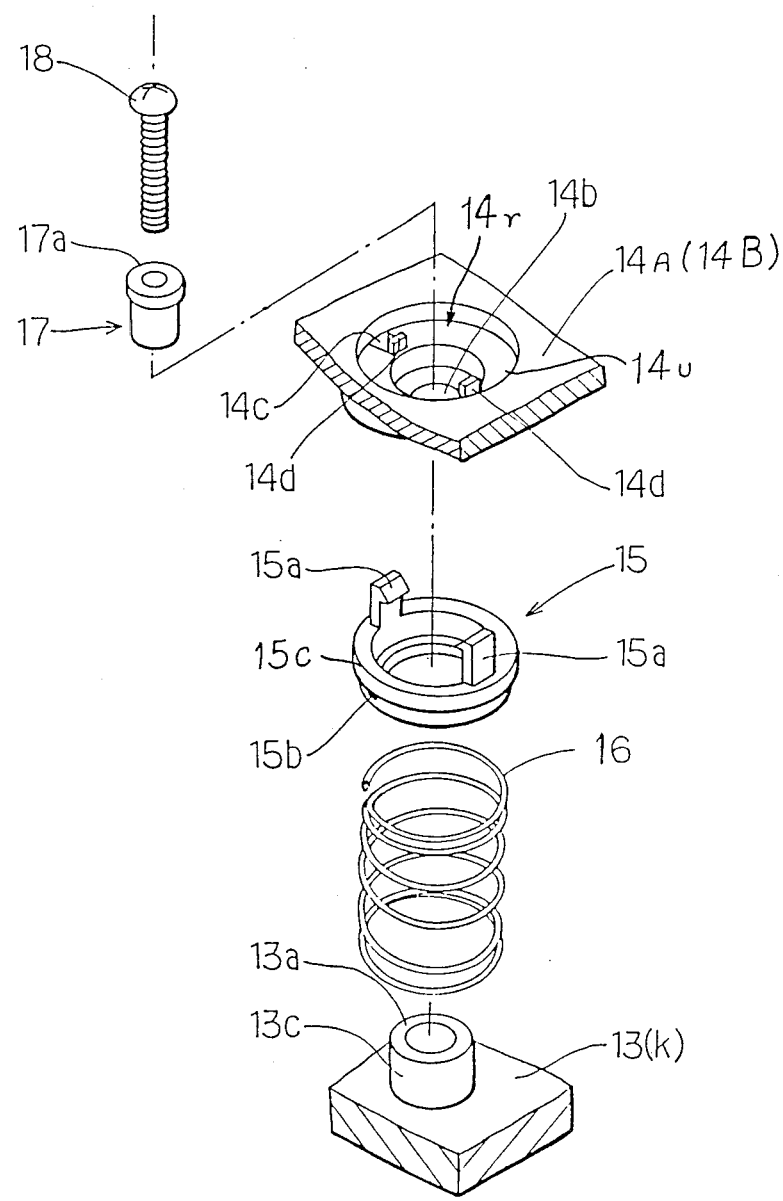
FIG. 4 is an exploded perspective view of primary parts of the horn switch mechanism of FIG. 3.

The retainer clip 15 has a plurality of locking studs 15b (only one of which is shown in FIG. 4) for holding the upper end of the coil spring 16 on an annular lower surface of a collar 15c of the clip, as is the case for the known clip of this type.

Each of the flanged spacers is inserted downwardly through the insertion bore 14b into the corresponding guide projections 13c of the stationary contact plate 13, and then a screw, 18 is threaded through the spacer 17 into a respective through-hole 13b of the stationary contact plate for thereby fixing the flanged spacer 17 to the latter. The flanged spacer 17 is also made of a synthetic resin. The flanged spacer 17 has a flange 17a, a lower surface of which is engaged by the annular lower step portion 14l of the two-stepped recess 14r so as to restrict upward movement of the movable contact plate 14A (14B) relative to the stationary contact plate 13 and hence to limit a distance of the space between the two plates 13 and 14A (14B), as shown in FIG. 3. The distal end of the screw 18 pass through the through-hole 13b and is screwed into a lower cover 20, thereby fixing the flanged spacer 17 and the lower cover 20 to the stationary contact plate 13.

A horn pad 11 is secured to the movable contact plate 14A (14B). To this end, the movable contact plate 14A (14B) has a plurality of apertures 14e at predetermined positions for receiving the corresponding locking legs 11a of the horn pad 11. The aperture 14e is defined by an upwardly raised wall which has a truncated cone shape to retain a shoulder portion of the locking projection 11a at its undersurface. The movable contact plate 14A (14B) is electrically connected to a positive terminal of a horn control circuit (not shown) via a lead 19. The horn pad 11 has a plurality of studs 11b at predetermined positions, which are normally held against the upper surface of the movable contact plate 14A (14B) for holding the horn pad stationarily in place on the movable contact plate 14A (14B) and also for supporting the movable contact plate when an external compressive force is applied to the pad during the operation of the horn. (See FIGS. 3 and 4).

The stationary contact plate 13 has its contact point 13a defined at the upper end of the guide projection 13c, and the movable contact plate 14A (14B) has its contact point 14a defined at the annular lower edge defining the insertion bore 14b. The stationary contact plate 13 is connected to a negative terminal of the horn control circuit via the boss b.

The components of the horn switch mechanism according to this embodiment of the present invention are assembled as described hereinbelow.

Each of the retainer clips 15, with the coil spring 16 held thereon, is first inserted upwardly around the corresponding insertion bore 14b of the movable contact plate 14A (14B) to be secured to the respective movable contact plate such that the locking legs 15a are received in the windows 14c and locked by the hooks 14d. The lead 19 is connected to a predetermined point of the movable contact plate 14A (14B). Then the movable contact plate 14A (14B) is placed at a suitable position above the stationary contact plate 13.

Each of the flanged spacers 17 is inserted through the insertion bore 14b into the guide projection 13c of the stationary contact plate 13. The screws 18 are then threaded through the respective flanged spacers 17 and screwed fixedly to the lower cover 20 underlying the stationary contact plate 13 for thereby fixing the spacers and the lower cover 20 to the stationary contact plate 13.

Finally, the horn pad 11 is joined with the movable contact plates 14A, 14B by causing its locking legs 11a to be locked in the apertures 14e.

Since the screw 18 is inserted through the flanged spacer 17 in the insertion bore 14b which is fixedly positioned in the guide projection 13c of the stationary contact plate 13, the movable contact plate 14A (14B) is prohibited form being shifted out sidewardly, thus making it unnecessary to additionally align the spacer and hence the movable contact plate with respect to the stationary contact plate. As a result the screw is fastened with ease, and thus the assembling of the horn switch mechanism is performed with an increased efficiency.

With this arrangement, the contact points 13a, 14a of the stationary and movable contact plates 13 and 14A (14B) are disposed substantially in vertical registry with the guide projection 13c, the through-hole 13b and the insertion bore 14b which serves to locate the flanged spacer 17, with the result that the distance between the contact points and the flanged spacers needs not to be controlled, although it is required in the conventional horn switch mechanism. This means that the location of the contact points 13a, 14a is fully determined by controlling the positioning of the flanged spacer 17.

In operation, the horn pad 11 is pressed down by a driver or operator of the steering wheel W, whereupon the movable contact plates 14A, 14B are moved downwardly along the flanged spacer 17 against the bias force of the coil spring 18 as it is guided by the flanged spacer 17. Consequently, the contact point 14a on the annular lower edge of the insertion bore 14b in the movable contact plate 14A (14B) is brought into contact with the contact point 13a on the upper end of the guide projection 13c on the stationary contact plate 13, thereby energizing the horn (not shown) via the control circuit.

In this particular embodiment, the stationary contact plate 13 is in the form of the link k made of a die-casting alloy plate interconnecting the boss b and the spoke metal core s when the metal core member w of the steering wheel W is manufactured. The contact points on the upper end of the guide projection 13c and the annular lower surface of the insertion bore 14b and be galvanized with a suitable metal such as a phosphor bronze.

Figure 6:
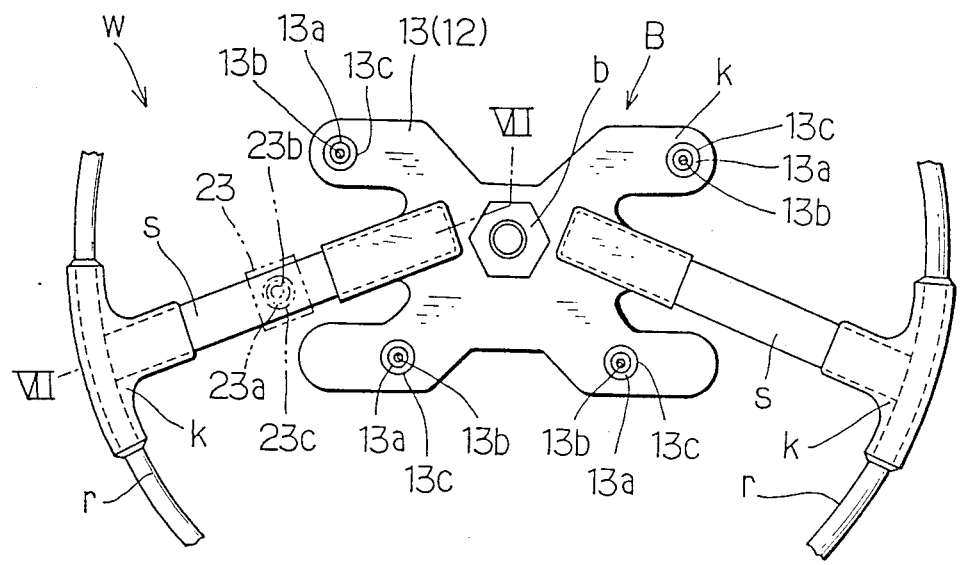
FIG. 6 is a plan of a metal core member of a steering wheel on which the switch mechanism is mounted.
Figure 7:
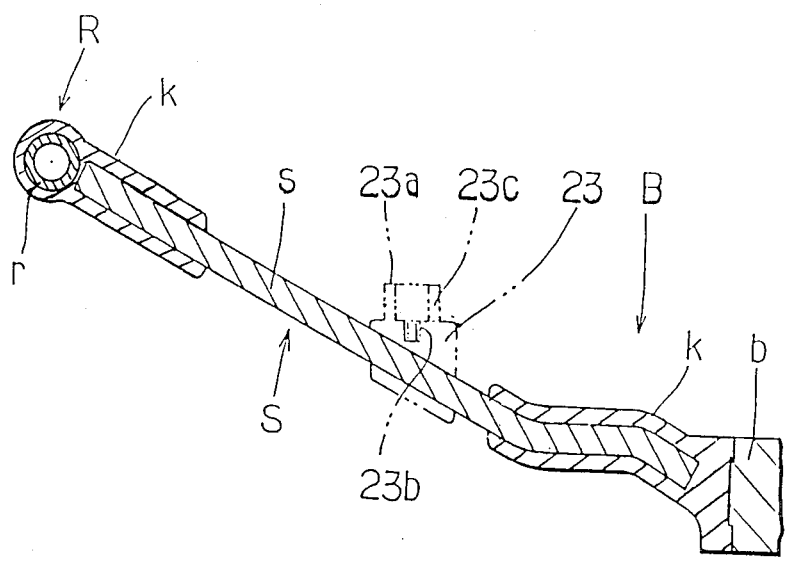
FIG. 7 is a vertical cross-sectional view taken along line VII—VII of FIG, 6.

In case the horn pad covers an increased number of spokes of the steering wheel, a stationary contact plate 23 of a die-casting metal is formed on the metal core member s of the spoke remotely from the link k when the latter is molded, as shown in a broken line in FIGS. 6 and 7. More particularly, the stationary contact plate 23 has a cylindrical guide projection 23c defining a contact point 23a at its top end, and a threaded bore 23b formed centrally at a bottom of the guide projection for securing a flanged spacer (not shown) by a screw (not shown) as best shown in FIG. 7.

Figure 8:
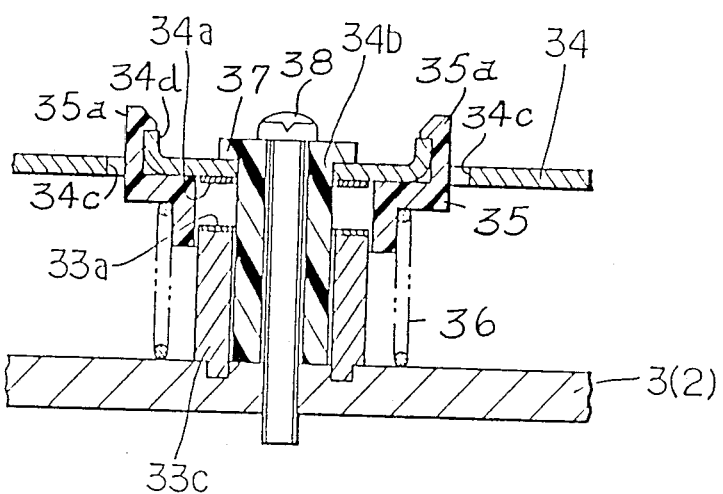
FIG. 8 is a vertical cross-sectional view of another embodiment of the invention.

In the horn switch mechanism of the above-described embodiment, the stationary contact plate 13 has a guide projection 13c which is formed integrally thereon to provide the contact point 13a. Alternatively, an electrically conductive metal tube or boss may be welded to the stationary contact plate 33 formed of a conventional steel boss plate 32 for thereby forming a guide projection 33c, as shown in FIG. 8. Further, a contact point 33a of the stationary contact plate may be formed on the upper end of the guide projection 33c, while a contact point 34a of a movable contact plate 34 is formed on an annular lower edge defining an insertion bore 34b in confrontation with the upper end of the guide projection 33c. In FIG. 8, 36 designates the compression coil spring, 35 the tubular retainer clip with its locking legs 35 a which are inserted through windows or apertures 34c and engage on locking projections or hooks 34d (formed as upturned edges of the movable contact 34), 37 the flanged spacer and 38 the screw, all corresponding, in general, to the respective elements depicted in FIG. 4.

The flanged spacer 17 of the above-described embodiment is adapted to be inserted downwardly through the movable contact plate 14A (14B) from the upper side thereof. Alternatively, the flanged spacer 17 may be inserted upwardly through the stationary contact plate 13 from the lower side thereof, and may be provided with a contact point of the stationary contact plate 13 at its upper end.

In the above-described embodiment, the bias means for urging the movable contact plate 14A (14B) to move away from the stationary contact plate 13 is in the form of the coil spring 16 disposed coaxially of the flanged spacer 17 and the contact points 13a and 14a. However, the spring means may be disposed remotely from the flanged spacer 17, and may be formed of another resilient member such as a leaf spring.

What is claimed is:

1. A horn switch mechanism mounted on a steering wheel having a boss, spokes and a ring, each being formed of a metal core member covered with a covering, comprising:
   (a) a stationary contact plate;
   (b) a movable contact plate disposed upwardly away from said stationary contact plate;
   (c) a horn pad connected to and covering said movable contact plate;
   (d) spring means disposed between said movable contact plate and said stationary contact plate for normally urging said movable contact plate away from said stationary contact plate;
   (e) a plurality of tubular projections projecting upwardly from said stationary contact plate, each having an outside diameter and an inside diameter, said movable contact plate having plurality of bores each having a diameter substantially equal to the inside diameter of a respective said projection, each said bore being disposed in axial registry with the corresponding one of said projections; and
   (f) a plurality of spacers each having a radially outwardly extending flange provided at an upper portion thereof, and each said spacer being inserted downwardly through a respective said bore of said movable contact plate onto a respective said projection and fastened so as to be secured fixedly to said stationary contact plate, said flange of each said spacer being disposed in engagement with an upper surface of said movable contact plate at a respective peripheral edge defining a respective said bore, for restricting a further upward movement of said movable contact plate in a direction axially away from said stationary contact plate as is tending to be caused by said spring means, upper ends of respective ones of said projections of said stationary contact plate each forming a first contact member, and respective lower surfaces of said movable contact plate each forming a second contact member adapted to engage a respective said first contact member.

2. A horn switch mechanism according to claim 1, wherein:
   said stationary contact plate is made of an electrically-conductive diecasting metal alloy, said projections being formed integrally with said stationary contact plate.

3. A horn switch mechanism according to claim 2, wherein:
   said stationary contact plate is constituted by a part of said metal core member of said boss.

4. A horn switch mechanism according to claim 2, wherein:
   said stationary contact plate is constituted by corresponding parts of said metal core members of said spokes.

5. A horn switch mechanism according to claim 1, wherein:
   said projections are formed independently from said stationary contact plate, and are secured fixedly to said stationary contact plate by respective securing means.

* * * * *